(12) United States Patent
Li et al.

(10) Patent No.: US 11,389,271 B2
(45) Date of Patent: Jul. 19, 2022

(54) NICKEL-TITANIUM FILE ROOT CANAL PREPARATION INSTRUMENT

(71) Applicant: Yihe Li, Beijing (CN)

(72) Inventors: Yanfeng Li, Beijing (CN); Yihe Li, Beijing (CN); Yuan Lv, Beijing (CN); Guangquan Chai, Beijing (CN); Yidan Sun, Beijing (CN); Huanyue Liu, Beijing (CN); Xihua Ma, Beijing (CN)

(73) Assignee: Yihe Li, Beijing (CN)

( * ) Notice: Subject to any disclaimer, the term of this patent is extended or adjusted under 35 U.S.C. 154(b) by 310 days.

(21) Appl. No.: 16/485,120

(22) PCT Filed: Jan. 9, 2018

(86) PCT No.: PCT/CN2018/071942
§ 371 (c)(1),
(2) Date: Aug. 9, 2019

(87) PCT Pub. No.: WO2018/130147
PCT Pub. Date: Jul. 19, 2018

(65) Prior Publication Data
US 2019/0365505 A1    Dec. 5, 2019

(30) Foreign Application Priority Data

Jan. 11, 2017 (CN) .......................... 201710019393.4

(51) Int. Cl.
*A61C 5/42* (2017.01)

(52) U.S. Cl.
CPC ..................................... *A61C 5/42* (2017.02)

(58) Field of Classification Search
CPC .... A61C 5/40; A61C 5/42; A61C 5/50; A61C 5/55
See application file for complete search history.

(56) References Cited

U.S. PATENT DOCUMENTS

| | | | | |
|---|---|---|---|---|
| 5,538,423 A | * | 7/1996 | Coss | A61C 1/0015 433/101 |
| 5,653,590 A | * | 8/1997 | Heath | A61C 5/42 433/102 |
| 5,733,117 A | * | 3/1998 | Coss | A61C 1/18 433/85 |

(Continued)

*Primary Examiner* — Ralph A Lewis
(74) *Attorney, Agent, or Firm* — Birch, Stewart, Kolasch & Birch, LLP

(57) ABSTRACT

A nickel-titanium file root canal preparation instrument, including a nickel-titanium preparation system and a water flushing system. The nickel-titanium preparation system includes a nickel-titanium file, a handheld device head, a handheld device body, an electric motor, and a power controller; the water flushing system includes a conduit, a conduit fixing device, a liquid pump, and a liquid pump controller. The existing theory and study regarding root canal preparation has misled people about the root canal preparation method, and this leads to the result that the existing nickel-titanium root canal preparation is implemented in a dry-drilling manner. By providing a water flow to perform flushing during the root canal preparation of the nickel-titanium file root canal preparation instrument, the service life of the nickel-titanium file is prolonged.

6 Claims, 1 Drawing Sheet

(56) References Cited

U.S. PATENT DOCUMENTS

| | | | | |
|---|---|---|---|---|
| 6,315,557 B1* | 11/2001 | Messick | ............... | A61C 1/0015 |
| | | | | 433/82 |
| 2005/0112525 A1* | 5/2005 | McPherson | .............. | A61C 5/40 |
| | | | | 433/81 |
| 2010/0279250 A1* | 11/2010 | Pond | ...................... | A61C 17/14 |
| | | | | 433/80 |
| 2014/0212834 A1* | 7/2014 | Yared | ....................... | A61C 5/40 |
| | | | | 433/102 |

* cited by examiner

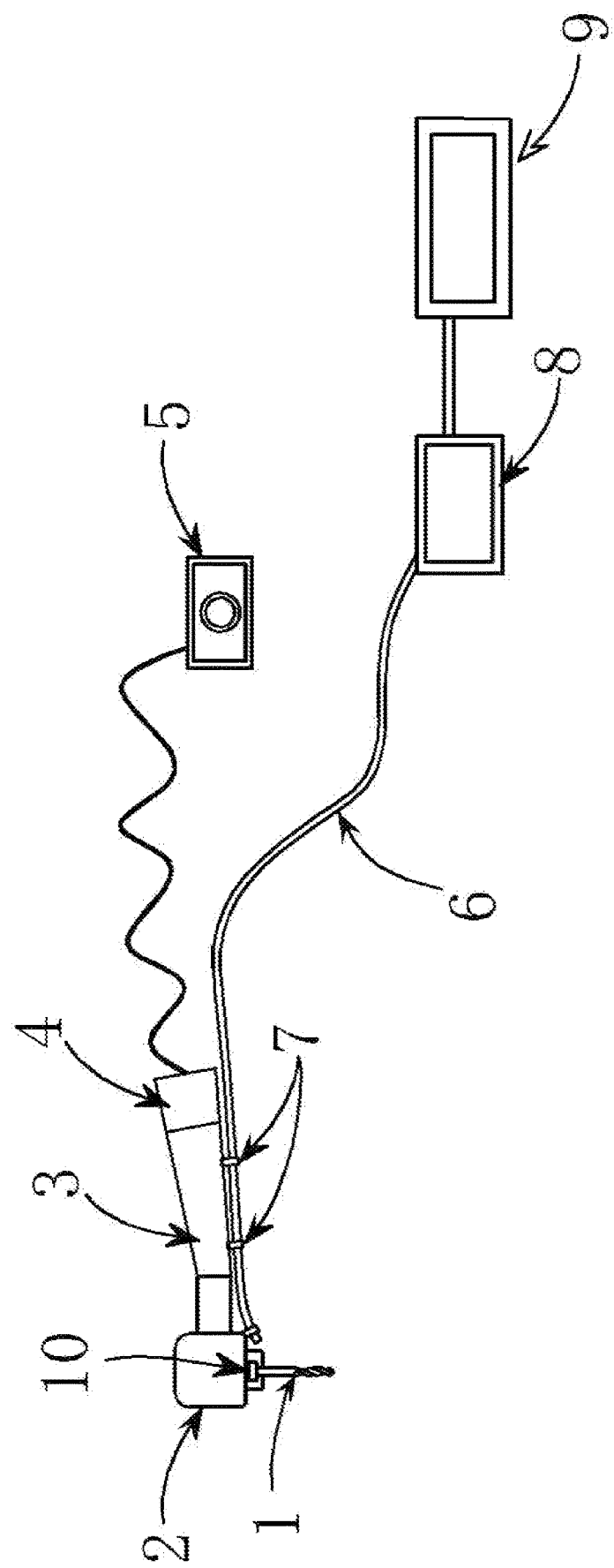

NICKEL-TITANIUM FILE ROOT CANAL PREPARATION INSTRUMENT

RELATED APPLICATIONS

The application requests priority of Chinese application No. 201710019393.4, entitled "A preparation instrument of root canal with nickel-titanium file" filed on Jan. 11, 2017.

TECHNICAL FIELD

The invention relates to a dental treatment apparatus, exactly involved in a preparation instrument of root canal with nickel-titanium file for cleaning the root canal of a tooth.

BACKGROUND OF THE INVENTION

At present, there are lots kinds of nickel-titanium systems and instruments that are widely used in the home market, while there is a potential risk of fractures for using the nickel-titanium instruments for machine in any system and few studies show the maximum usage of nickel-titanium instruments. Most foreign dental pulp doctors and manufacturers suggest disposable use of nickel-titanium products, which cannot be achieved in consider of the current oral medical conditions in China.

Currently, the nickel-titanium files tend to easily break after being used for several times (e.g. Peng Bin, et al's study shows that ProTaper file S1 can prepare 25 anterior teeth, 12 premolars and 2 odontoprisis, and other models can prepare 50 anterior teeth, 20 premolars and 4 odontoprisis), while the nickel-titanium files cost more. As a result, it is one of the research focuses that how to make nickel-titanium instruments safer within the recommended safe usage or to reduce the instruments fatigue to increase the use times, while to ensure the effect of Root canal therapy (RCT).

At present, during using the nickel-titanium files for root canal preparation, it mainly adopts the dry drilling, because the early studies suggest that nickel-titanium file has the increased probability of transverse cracking under water.

Specifically, in a paper titled "Effect of Environment on Low-cycle Fatigue of a Nickel-Titanium Instrument" published in Vol 33, No. 12 of Basic Research-Technology in December 2007, it disclosed information as below: Although water and sodium hypochlorite can reduce temperature, they are corrosive to exposed metals, especially at low amplitudes, which conforms to metal fatigue behaviors in corrosive environments. At high amplitudes, it does not have enough time for the metal to be corroded, and similar to the cracks of the bending of a circular beam, cracks occur on the surface of the nickel-titanium files, starting with a single crack. The corrosive liquid (water and sodium hypochlorite) may accelerate the crack growth."

Besides, in an article entitled "Fatigue testing of a NiTi rotary instrument. Part 1:strain-life relationship" published in 2007 in the page 612-618, Vol 40 of International Endodontic Journal, it also disclosed that various cross-sections and processing grooves may cause differences in fatigue life of nickel-titanium instruments. Water may induce the material cracks, and reduce cycle fatigue life.

Based on previous reports, currently in clinical practice, root canal is prepared by dry drilling.

DESCRIPTION OF THE INVENTION

However, the inventor of this application has found in both clinical and experimental trials that the above theory is not completely correct. Therefore, different washing conditions were used in the invention for experiments, and finally a way was found to prolong the life of nickel-titanium files, with the relative root canal preparation instruments being provided.

Specifically, the present invention provides a preparation instrument for preparing root canal with Nickel-titanium file, wherein, the preparation instrument comprises: a nickel-titanium preparation system and a flushing system, wherein, the nickel-titanium preparation system includes a nickel-titanium file, a head of handset, a body of handset, an electric motor, and a power controller; the flushing system includes: a conduit, a conduit fixture, a liquid pump and a liquid pump controller and the nickel-titanium file is mounted under the head of handset;

The head of handset and the body of handset are fixed together, and the electric motor is drive connection with the nickel-titanium file passing through the body of handset and the head of handset, so as to drive the nickel-titanium file to rotate according to the control of the controlled power controller.

In one preferred implementation, the conduit is fixed on the body of handset by the conduit fixture, one end of the conduit is directed toward the nickel-titanium file, the other end is connected to the liquid pump, and the liquid pump controller is communicational connection with the liquid pump to control the liquid pump.

In another preferred implementation, the liquid pump is filled with liquids, and the liquid pump controller is used for controlling the flow and temperature of liquids pumped by the liquid pump.

In another preferred implementation, in the root canal preparation instrument, the power controller and the liquid pump controller are cooperatively controlled, the liquid pump can be simultaneously switched on when the electric motor is switched on to drive the nickel-titanium file for rotation, thus pumping the liquid and spraying on nickel-titanium file.

In another preferred implementation, the liquid pump pumps the liquid at the temperature of 6-40° C.

In another preferred implementation, the flushing system also comprises the flushing shower nozzle, and the flushing shower nozzle is installed at the front end of the conduit (6) to reserve the shape for water flow.

Technical Effects

In practice, the inventor of the present invention finds that the existing theoretical research on root canal preparation is misleading, as a result, the existing root canals preparation by nickel-titanium files are performed in the way of dry drilling, while via the examination by practice, the inventor finds that the water flushing may extend the service time of nickel-titanium file canals during preparation.

Specifically, the root canal preparation instruments with nickel-titanium file of the present invention use the liquid pump constantly to pump the liquids to the nickel-titanium files through a conduit during the root canal preparation and the rotation of the nickel-titanium file so as to, (1) lubricate the root canal, (2) reduce temperature of nickel-titanium files, and (3) wash out residues with the nickel-titanium files. It can also improve the preparation efficiency, prolong the service life, reduce the costs of patient and minimize suffering from the instrument fracture.

BRIEF DESCRIPTION OF DRAWINGS

The FIGURE is a structure diagram of the root canal preparation instruments in the embodiment of the invention.

REFERENCE SIGNS

1. Nickel-titanium file
2. head of Handset
3. body of Handset
4. Electric motor
5. Power controller
6. Conduit
7. Conduit fixation device
8. Liquid pump
9. Liquid pump controller

DETAILED DESCRIPTION OF EMBODIMENTS

The present invention will be described in detail below with respect to accompanying drawings and embodiments thereof. However, the scope of the present invention will not be limited to the scope described in embodiments.

Embodiment 1

As shown in the FIGURE, the root canal preparation instrument includes a nickel-titanium preparation system and a flushing system, wherein, the nickel-titanium preparation system includes a nickel-titanium file 1, a head of handset 2, a body of handset 3, an electro-motor 4 and a power controller 5. The flushing system includes: a conduit 6, a conduit fixation device 7, a liquid pump 8 and a liquid pump controller 9.

As shown in the FIGURE, the nickel-titanium file 1 is mounted below the head of handset 2. The head 2 is used for holding the nickel-titanium file and the body of handset 3 refers to a part of holding when preparing the root canal, enabling to control the direction of drill bit and lifting force during operation. The electro-motor 4 is used to generate and transmit power, which can be mechanically connected to the nickel-titanium file 1 by a transmission device. The power controller 5 is used to set the revolving speed and torque of the nickel-titanium file 1 during working. The electric motor 4 is connected with the nickel-titanium file 1 by a transmission device through the body of handset 3 and the head 2, then to drive the nickel-titanium file 1 to rotate based on the control of power controller 5.

The conduit 6 is fixed to the body of handset by the conduit fixation device 7, wherein, one end of the conduit 6 faces the nickel-titanium file and the other end is connected to the liquid pump 8. Liquid pumps can be loaded with different liquids, and allow controlling of the flow and temperature of the liquids. The front end of the conduit 6 points to the nickel-titanium file 1, preferably to a place higher than the center of the nickel-titanium file 1 (the "higher" here refers to the side near the root). The liquid pump controller is connected with the liquid pump 8 to control the flow amount, flow rate and temperature of the liquids.

In the root canal preparation instrument of the present invention, the power controller and the liquid pump controller are connected with each other. When used, the liquid pump 8 can be synchronously started while the power system is started up via the power controller 5 to drive the rotation of the nickel-titanium file 1, and then the liquids are pumped and sprayed onto the nickel-titanium file 1, so as to control the temperature of nickel-titanium file and to wash away the smear layer cut down and dentine debris promptly during the preparation of the root canal, which can prolong the service life of the nickel-titanium files and improve the preparation efficiency of the root canal.

Now, the nickel-titanium files are widely used in dentistry, while there is a potential risk of fractures for using the nickel-titanium files, and none of the nickel-titanium file motor of various brands has a water spraying function. Such a defect is remedied by the device of the present invention by adding a liquid pump system on the nickel-titanium file handset, and reduces the risk of fractures to a certain extent.

In this embodiment, the numbers of root canal preparations under different washing conditions were counted to confirm the advantages of the invention.

In this embodiment, transparent root canal modules are made by resin, with 30 root canals (15*2) 80*22*31 mm in size on each module. The space between each two root canals in the same row was 5.2 mm, and space between two rows of root canals is 14 mm, with active length of 18 mm. The angle of curvature was α=60° curvature radius is r=6 mm, and root canals taper was 0.02. Opening is at the tips of the root tip, and the length of No. 15 enlarge needle is equal to the depth of the root canals.

Nickel-titanium motor for X-smart plus machine is used in the ProTaper system mode, and the parameters in which are: Rotation Rate 350 rpm, torque 3.0 Ncm, the pointer type push tension meter is reset zero after the motor is fixed, and the vertically downward force of the root canal is 10 N. The water flow of flushing system (which also has the ability of blowing air) is controlled at about 3 ml/s and the water temperature 32° C.±1° C.

In this embodiment, 60 F1 files are divided into 4 groups, 15 ones in each group.

Respectively denoted as: Dry drilling group, dry gas group, water and gas group, and water flow group. The first group is the dry drilling group, which does not have any washing and filing needle cleaning treatment. The second group is the aeration group, in which the flush conduit is placed about 1 cm away from the root canal orifice, and the gas button is pressed to its maximize during the preparation, continuously blow air towards the file needle. The third group is water and gas group. The water and air buttons are pressed to the maximum at the same time and water and air continuously flush towards the file needle. The fourth group is water flow group. The water button is pressed to the maximum and water continuously flush towards the file needle.

TABLE 1

Number of Root Canals Prepared for the Four Groups F1 Files before they broken n (Pcs$\bar{x}$ ± s)

| Group species | n | Root canal number |
|---|---|---|
| Dry drilling group | 15 | 3.80 ± 2.24 |
| Dry gas group | 15 | 3.77 ± 1.73 |
| Water and gas group | 15 | 5.73 ± 3.00 |
| Water flow group | 15 | 7.71 ± 2.07 |

According to the statistical results, the numbers of root canals prepared in the two groups with water are more than those for the two groups without water, wherein the number of root canals prepared by the water flow group is larger than that of the water and gas group, and is significantly larger than those of the dry drill group and the dry gas group. That is, as for numbers of root canals prepared of the 4 groups: the number of water flow group is the largest, followed by number of the water and gas group, and finally number of the dry drilling and dry gas group (the water flow group>water and gas group≈dry drilling group).

It can be confirmed by this embodiment that the conclusions drawn from the two articles mentioned in the background technology have misled existing technicians, inducing the dry drilling is used in root canal preparation at present. In fact, the way of dry drilling is not better than the way of flushing for the service life of nickel-titanium file.

Embodiment 2

In this embodiment, the root canal preparation instrument used is basically the same as that of embodiment 1. However, in this embodiment, a liquid temperature control device is added, and it is installed on a liquid pump or a liquid pump controller to control the temperature of the liquid pumped by the liquid pump. Then, the inventor prepares the root canal flushing water with different temperature.

The prepared results are as follows:

TABLE 2

The Comparison of Parameters at Three Temperatures ($\bar{x} \pm s$, n = 60)

| Parameter | 6° C. group | 23° C. group | 40° C. group | P value |
|---|---|---|---|---|
| The number of root canals prepared (Pcs) | 1.78 ± 1.09 | 4.66 ± 2.77 | 8.02 ± 1.84 | 0.00** |
| The total times of lifting or drawing of each file (times) | 36.80 ± 18.40 | 70.45 ± 35.18 | 111.85 ± 25.53 | 0.00** |
| Average number of lifting or drawing for each root canal (times) | 23.33 ± 7.57 | 16.19 ± 2.95 | 14.01 ± 1.39 | 0.00** |
| Dredging times (times) | 1.04 ± 0.11 | 1.10 ± 0.16 | 1.17 ± 0.16 | 0.00** |

Notes:
**$P < 0.01$.

TABLE 3

The Number of Root Canal Lateral Penetration at Three Temperatures and a Comparison of Proportions of Lateral Penetration

| Group category | The number of lateral penetration | The number of not lateral penetration | The total number of root canal | The lateral penetration rate (%) |
|---|---|---|---|---|
| 6° C. group | 0 | 47 | 47 | 0 |
| 23° C. group | 1 | 96 | 97 | 1.03 |
| 40° C. group | 22 | 153 | 175 | 12.57 |
| Total | 23 | 296 | 319 | 7.21 |

The applicant found that the normal temperature flushing group could prepare more root canals and prolong the service life of nickel-titanium files; when flushes with heat water, the number of root canals prepared by nickel-titanium file is the largest and the instrument is not easy to break. However, the lateral puncture is more likely to occur during root canal preparation. Therefore, the normal/room temperature flushing is preferred, especially at 23 degrees Celsius. When the temperature is 23° C., the number of root canals prepared by the nickel-titanium file is large and the instrument is not easy to break in the experiment, which is the best temperature point. The inventor also selected the lower temperature (6° C.) and the higher temperature (40° C.) for the experiment, and which were not as good as those at room temperature. In addition, the applicant also selected 12° C., 18° C., 27° C. and 33° C. for similar experiments. The first two temperatures were prone to fracture, while the latter two temperatures were prone to lateral penetration.

Embodiment 3

In this embodiment, the similar root canal preparation instrument as embodiment 1 is used, except that, and a different kind of flushing control is used in this embodiment.

Specifically, in this embodiment a flow control device is added and the temperature is controlled at 23° C. It uses different flushing flows for root canal preparation. The small flow is 220 ml/min and the large flow is 270 ml/min.

The prepared results are as follows:

TABLE 4

Comparison of various Parameters in Two Groups of Different Flows ($\bar{x} + s$, N = 40)

| Parameters | Small flow group | Big flow group | P value |
|---|---|---|---|
| The number of root canals prepared (Pcs) | 4.66 ± 2.77 | 6.50 ± 2.42 | 0.03* |
| The total times of lifting or drawing of each file (times) | 70.45 ± 35.18 | 104.35 ± 39.71 | 0.00** |
| Average number of lifting or drawing for each root canal (times) | 16.19 ± 2.95 | 16.16 ± 1.48 | 0.96 |
| Dredging times (times) | 1.10 ± 0.16 | 1.09 ± 0.11 | 0.92 |

Notes:
*$P < 0.05$,
**$P < 0.01$.

TABLE 5

The Number of Root Canal Lateral Penetration at Two Flows and a Comparison of Proportions of Lateral Penetration

| Group category | The number of lateral penetration | The number of not lateral penetration | The total number of root canal | The lateral penetration rate (%) |
|---|---|---|---|---|
| Small flow | 1 | 96 | 97 | 1.03 |
| Large flow | 1 | 134 | 135 | 0.74 |
| Total | 2 | 230 | 232 | 0.86 |

Applicant finds that the small flow flushing is more likely to cause the nickel-titanium file broken than the large flow flushing upon preparation of root canal. Neither of the groups of the flow is easy to cause lateral penetration of the root canal, and the preparation efficiencies are basically the same. Clinically, the water flow can be appropriately increased, the fatigue resistance performance of the nickel-titanium file can be increased, and the service life can be prolonged.

Embodiment 4

In this embodiment, a root canal preparation instrument similar to that of the embodiment 1 is adopted, but different from the embodiment 1, in additional to the head of handset 2, the body of handset 3, the electric motor 4, and the power controller and conduit 6, the conduit fixture 7, the liquid pump 8 and the liquid pump controller 9, the pressure sensor 10 is added to the head of the handset. The pressure sensor 10 is used to measure the pressure between the Nickel-titanium file and the teeth, and control the water injection flow of the liquid pump based on the above pressure, so that the water flow gradually increases from the anhydrous state with the increase of prepared pressure of nickel-titanium file, and the greater the pressure is, the larger the water flow is.

Such kind of water injection method is adopted to prolong the service life of the Nickel-titanium file and reducing the flushing amount, so as to improve the preparation efficiency of root canal.

In one preferred embodiment, a shower nozzle is added to the front end of the conduit. The pressure sensor is capable of measuring the direction of the pressure and the flushing direction of the shower nozzle is adjusted based on the pressure direction. Further, the flushing shower nozzle is opposite to one side where the Nickel-titanium file contacts the teeth.

The above are only the preferred embodiments of the present invention, and are not intended to limit the present invention in any way. Any simple modifications made to the above embodiments in accordance with the technical spirit of the present invention are within the spirit and principles of the present invention. Equivalent changes and modifications are still within the scope of the invention.

Although the principles of the invention have been described in detail in combination with the optimization implementation case of the invention, the technicians in this field shall understand the above implementation case only explains the schematic implementation model of this invention instead of the limitation of the invention scope. The details in the implementation case don't restrict the scope of the invention, and any obvious change such as equivalent transformations, simple substitutions, etc. based on the technical solutions of the invention, is within the protection scope of the invention without violation of spirit and scope of the invention.

The invention claimed is:

1. A root canal preparation instrument with nickel-titanium file, wherein, the preparation instrument comprises:
   a nickel-titanium preparation system; and
   a flushing system,
   wherein the nickel-titanium preparation system includes a nickel-titanium file, a head of handset, a body of handset, an electric motor, and a power controller;
   wherein the flushing system includes a conduit, a conduit fixture, a liquid pump and a liquid pump controller, and the nickel-titanium file is mounted under the head of handset;
   wherein the head of handset and the body of handset are fixed together, and the electric motor is drive connection with the nickel-titanium file passing through the body of handset and the head of handset, so as to drive the nickel-titanium file to rotate in the control of the controlled power controller; and
   wherein the head of the handset includes a pressure sensor configured to measure the pressure between the Nickel-titanium file and a tooth to be cured of a patient, and an injected water flow of the liquid pump is controlled based on the measured pressure, so that the greater the pressure is, the larger the injected water flow is.

2. The preparation instrument of claim 1, wherein the conduit is fixed on the body of handset by the conduit fixture, one end of the conduit is directed toward the nickel-titanium file, the other end is connected to the liquid pump, and the liquid pump controller is in communicational connection with the liquid pump to control the liquid pump.

3. The preparation instrument of claim 1, wherein the liquid pump is filled with liquids and the liquid pump controller is used for controlling the flow and temperature of liquids pumped by the liquid pump.

4. The preparation instrument of claim 1, wherein in the root canal preparation instrument, the power controller and the liquid pump controller are cooperatively controlled, the liquid pump can be simultaneously switched on when the electric motor is switched on to drive the nickel-titanium file for rotation, thus pumping the liquid and spraying on nickel-titanium file.

5. The preparation instrument of claim 1, wherein the liquid pump pumps the liquid at a temperature of 6-40° C.

6. The preparation instrument of claim 1, wherein the flushing system further comprises a flushing shower nozzle, and wherein the flushing shower nozzle is installed at a front end of the conduit to reserve the shape for water flow.

* * * * *